Dec. 9, 1941.    G. L. SCHWAB    2,265,454
HUB GENERATOR
Filed Aug. 1, 1939

GEORGE L. SCHWAB INVENTOR.

BY Rollandet, McGrew & Campbell
ATTORNEYS.

Patented Dec. 9, 1941

2,265,454

UNITED STATES PATENT OFFICE 2,265,454

HUB GENERATOR

George L. Schwab, Denver, Colo.

Application August 1, 1939, Serial No. 287,722

2 Claims. (Cl. 171—209)

This invention relates to improvements in electrical generators, more particularly in small generators adapted to be incorporated in the hub of a wheel of a bicycle or like vehicle.

As is well-known, it is desirable to provide a headlight and tail-light for a bicycle to facilitate travel at night. Heretofore it has been difficult to provide a satisfactory source of electrical energy for such lights because, for instance, batteries will run down sooner or later, and former means of driving small generators on bicycles have proven unsatisfactory.

The principal object of the present invention is to construct a relatively small electrical generator that is adapted to be incorporated in the hub of a bicycle wheel to be driven by said wheel in order to provide a continuous and dependable source of electrical energy for lights on the vehicle, for operating either visual or audible signals, or for any other purpose.

Another and more particular object is to provide a small generator of this character that is extremely simple in design and arranged to generate an electric current even when the vehicle into which it is built, is operated at relatively slow speeds.

Still another object is to provide a combination axle shaft and electrical generator that readily may be incorporated into an ordinary front wheel of a bicycle or similar vehicle.

Other objects and advantages reside in details of design and construction which will be more fully disclosed in the following description and in the drawing wherein like parts have been similarly designated and in which.

Figure 1:
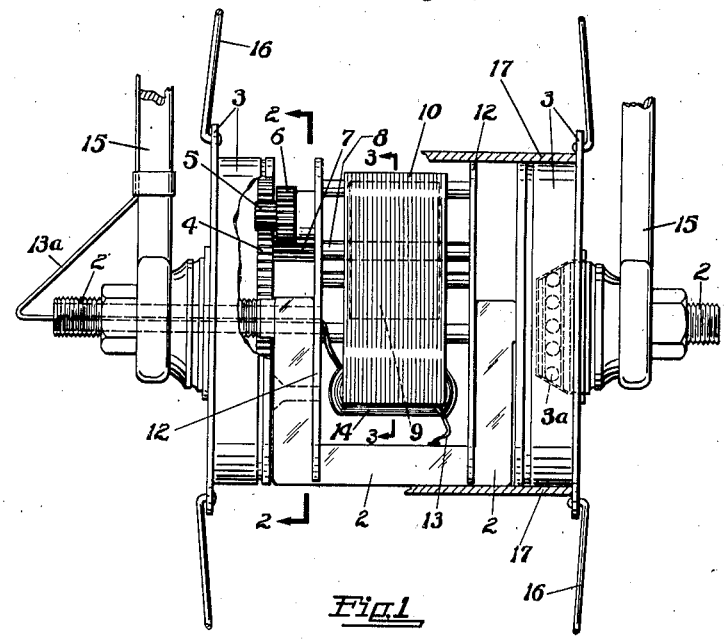
Figure 1 is a fragmentary elevation partially in section, illustrating a device made according to the present inventive concept.
Figure 2:
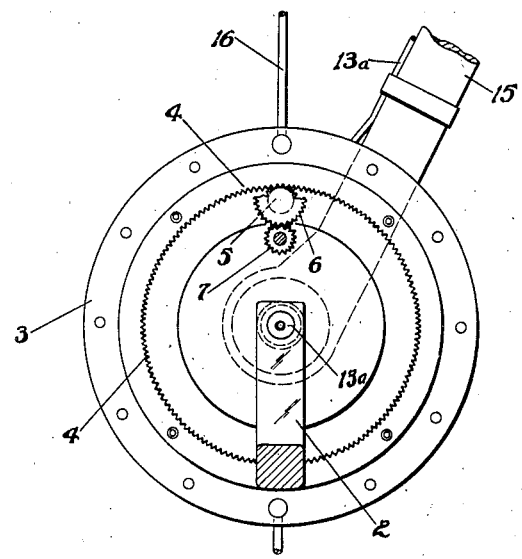
Figure 2 is a sectional view taken along the line 2—2 of Figure 1.
Figure 3:
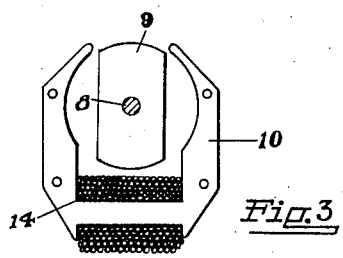
Figure 3 is a sectional view taken along the line 3—3 of Figure 1.

In order to disclose an operable reduction to practice of the present invention, reference will be had in detail to the accompanying drawing. However, it is to be understood that the example herewith illustrated and described is not intended to express or imply any limitation to the scope of this inventive concept, which is measured by the appended claims.

In the drawing, reference character 2 denotes an offset or spanner shaft that is particularly adapted for use in the hub of a bicycle wheel or the like. Flanged disks 3 are rotatably mounted upon the shaft 2 and they may be provided with suitable anti-friction bearings 3a.

In one of the flanged disks 3 is located an internal gear 4 in which a pinion 5 meshes to drive a gear 6, which in turn meshes with a pinion 7 upon a shaft 8 which carries a magnetic rotor 9 positioned in the field of a laminated stator 10 which is suitably supported upon non-rotary plates 12. The rotor shaft 8 is also journalled in the plates 12.

The stator 10 has a field winding 14, one terminal of which may be conveniently grounded to the vehicle as at 13. The other terminal of the field winding is insulated from the vehicle and may be passed through a hole along the center line of the shaft 2 and thence to the lamps on the vehicle or to any other device to be electrically energized. The insulated conductor leading from the field winding 14 is represented at 13a.

The usual front fork of the bicycle frame is indicated at 15 and is carried upon the shaft 2. The usual spokes of the wheel may be attached to the flanges of the flanged disks 3, as shown at 16, and the entire generator assembly may be conveniently housed from dust, mud or other foreign matter, by a cylindrical housing 17.

The offset in the axle shaft 2 provides room for the generator assembly within the hub or housing 17, and the stationary plates 12 that support the generator assembly are carried upon said shaft 2.

It is clearly obvious that when the front wheel of the bicycle, as represented by the spokes 16, is rotated, the magnetic rotor 9 of the generator will be turned at a much higher relative speed due to its geared connection with one of the flanged disks 3. Thus when the vehicle is operated even at a comparatively slow speed, the generator will operate at sufficient speed to deliver a usable flow of electrical energy. Naturally, at increased vehicle speed, a greater flow of electrical energy will be produced by the generator.

The entire assembly is extremely compact and well enclosed for protection. It can readily be installed in the hub of any ordinary bicycle wheel or the like, where it is free from accidental contact with any other object, and entirely out of the way of the operator.

The offset shaft 2 and the offset relationship of the rotor in the stator all cooperate in combination to enable the generator assembly to be placed within the hub 17 in an unusually compact arrangement.

While this specification discloses preferred means for reducing the present invention to practice and a preferred embodiment of the invention, changes may occur to those skilled in the art and may be made within the scope of the appended claims, without departing from this inventive concept.

What I claim and desire to secure by Letters Patent is:

1. The combination with a vehicle wheel, of a non-rotary shaft for the wheel having a central crank-like portion offset with reference to the axis of rotation of said wheel, an electrical generator inclusive of a rotor and a stator carried upon said shaft and extending into the space provided by said offset, and means for driving the generator by rotation of the wheel.

2. The combination with a vehicle wheel, of a non-rotary shaft for the wheel having a central crank-like portion offset with reference to the axis of rotation of the wheel, plates carried upon the shaft in axially spaced relationship to each other, an electrical generator inclusive of a rotor and a stator carried on and between said plates and extending into the space provided by said offset, and means for driving the rotor by rotation of the wheel.

GEORGE L. SCHWAB.